(12) United States Patent
Hirose et al.

(10) Patent No.: US 6,427,880 B1
(45) Date of Patent: Aug. 6, 2002

(54) PLUG STRUCTURE FOR DRINKING CONTAINER

(75) Inventors: Masato Hirose; Eiji Otsuka, both of Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/990,155

(22) Filed: Nov. 20, 2001

(30) Foreign Application Priority Data

Nov. 30, 2000 (JP) ........................................ 2000-364901

(51) Int. Cl.[7] .............................. B67D 3/00; B67D 5/06
(52) U.S. Cl. ...................... 222/517; 222/472; 222/484; 222/509; 222/518
(58) Field of Search ................................ 222/470, 472, 222/484, 505, 509, 511, 517, 518; 141/387, 390–392

(56) References Cited

U.S. PATENT DOCUMENTS 4,648,535 A * 3/1987 Zimmermann ............... 222/472
5,615,808 A * 4/1997 Huang ........................ 222/472

* cited by examiner

*Primary Examiner*—Timothy L. Maust
(74) *Attorney, Agent, or Firm*—J.C. Patents (57) ABSTRACT

A liquid inlet located in the lower position of a liquid passage is sealed with the valve guide of a valve body. The lever pushes the valve guide of the valve body to open up the liquid inlet. A pair of fixing arms is provided on the edge of the lever. An insertion hole of the pivot installed in a protruding manner or two sidewalls of the liquid passage is formed on each fixing arm. When moving the lever in the direction opposite to operation around each fixing arm, the boss member is abutted on sidewalls to widen the gap between each fixing arm to remove the insertion hole from the pivot. This makes it easy to take apart and assemble the structured parts of the plug and makes it washable in every nook and corner inside the plug structure.

6 Claims, 8 Drawing Sheets

PLUG STRUCTURE FOR DRINKING CONTAINER

CROSS-REFERENCE TO RELATED APPLICATION

This application incorporates by reference Japanese application Serial No. 2000-364901, filed Nov. 30, 2000.

BACKGROUND OF THE INVENTION

1. Field of the Invention

The present invention relates to a plug structure. More particularly, the present invention relates to a plug structure for a drinking container, such as a thermos bottle or a water bottle.

2. Description of the Related Art

A plug structure for a drinking container was disclosed by a Japanese Utility Model Publication No. 59-41785 and a Japanese Utility Model Application Laying Open Publication No. 59-168240, in which a liquid passage and a guide cylinder are formed inside the plug body. The liquid passage has a liquid inlet at the bottom of the liquid passage and a liquid outlet connecting to a front end of the liquid inlet. The guide cylinder is installed in a hanging condition from the upper wall of the liquid inlet. A valve guide of a valve body is inserted into the guide cylinder for opening and closing the liquid inlet. A spring always pushes the valve guide upward, and is provided between the upper wall of the liquid inlet and a receiving seat on the upper part of the valve guide. A lever capable of swinging centered on the pivot is abutted on the upper end of the valve guide. The top of the lever protrudes from a notched part on the rear of the plug body. The valve body then moves down to open up the liquid inlet by pushing down the lever.

However, the mechanism above mentioned inserts the valve guide into the guide cylinder so that liquid inside the drinking container is invasive into the upper portion of the upper wall of the liquid inlet and so is hard to discharge. This causes the drinking container to emit unpleasant odor.

SUMMARY OF THE INVENTION

Accordingly, it is an object of the invention to provide a plug structure for a drinking container such that the inconvenience of taking apart and assembling the cylinder can be eased and the container is washable in every nook and corner inside the plug structure.

To achieve this and in accordance with the purpose of the invention, as embodied and broadly described herein, the invention provides a plug structure for a drinking container, comprising; a liquid passage having a liquid inlet at the bottom of the liquid passage and a liquid outlet connecting to a front end of the liquid inlet; a guide cylinder installed on an upper wall of the liquid inlet in a hanging condition; a valve body having a valve guide inserted to the guide cylinder for opening and closing the liquid inlet a spring provided between the upper wall of the liquid inlet and a receiving seat on the upper part of the valve guide, for sealing the liquid inlet with the valve body by constantly pulling up the valve guide; a lever capable of swinging centered on a pivot for abutting on an upper end of the valve guide, wherein the front end of the lever protrudes from a notched portion of the e rear part of the plug main body, and the liquid inlet is opened by moving the lever downwards to lower the valve body; a pair of fixing arms installed on the edge of the lever, each of the fixing arms having an insertion hole for the pivot; and a pair of boss members, abutting on the sidewalls when moving the lever in the direction opposite to operation so that the gap between the fixing arms is widened, and separating the insertion holes from the pivot. Additionally, other advantages are that a guide groove is provided to guide the pivot to the insertion hole inside the fixing arm, the liquid passage is capable of being taken apart, and the boss member is a hemispheric or tapered rib shape.

BRIEF DESCRIPTION OF THE DRAWINGS

Other objects, features, and advantages of the invention will become apparent from the following detailed description of the preferred but non-limiting embodiments. The description is made with reference to the accompanying drawings in which:

FIG. 10 is a cross-section of the upper part of a valve guide showing a status of installing a receiving se at.

DESCRIPTION OF THE PREFERRED EMBODIMENTS

Figure 1:
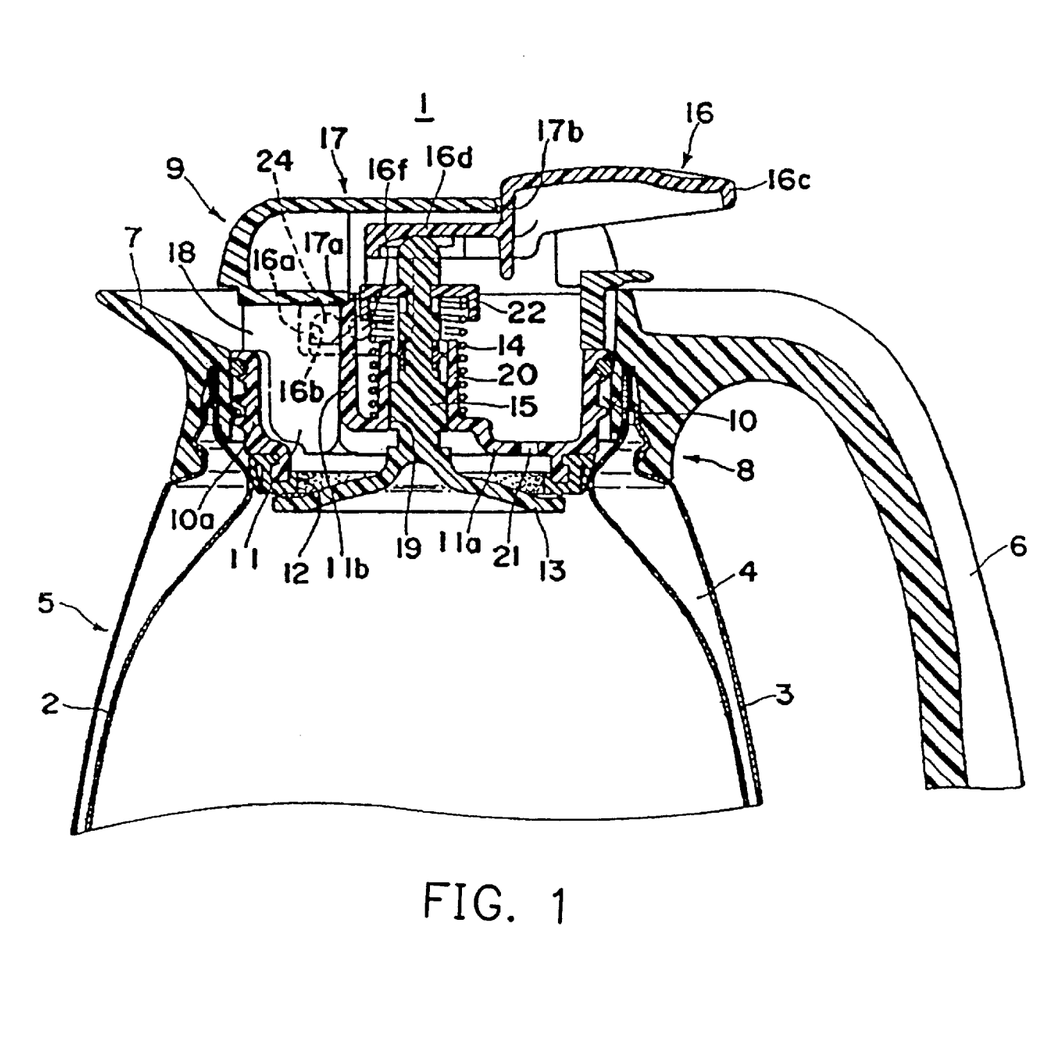
FIG. 1 is a cross-sectional view of a liquid inlet in a closed status for the upper part of the vacuum bottle.
Figure 2:
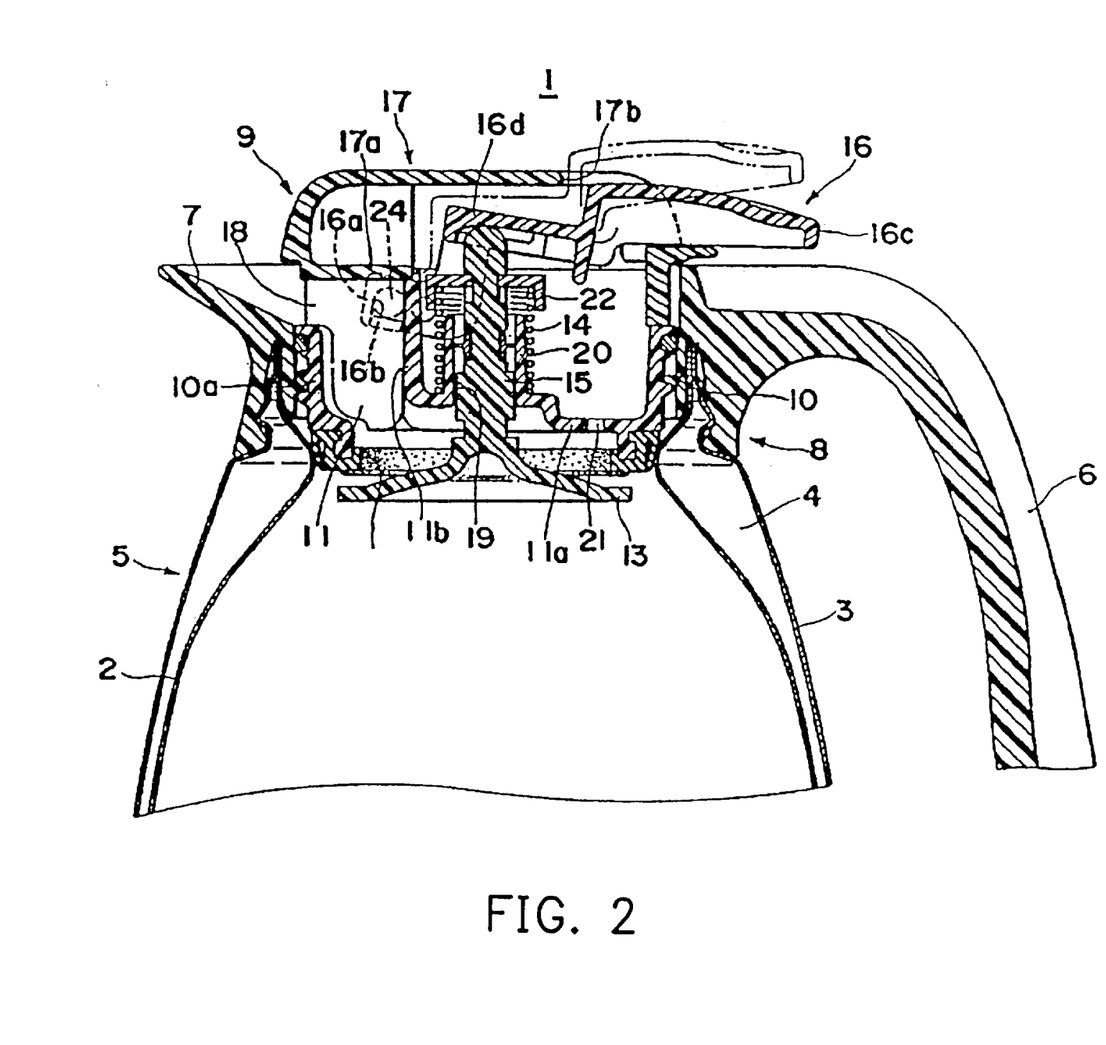
FIG. 2 is a cross-sectional view of a liquid inlet in an open status for the upper part of the vacuum bottle.

A vacuum bottle 1 (FIGS. 1 and 2) joins an inner container 2 in an open status of the upper part and the upper end of an outer container 3, and provides the vacuum insulation mechanism for the thermo-isolation zone 4 between the inner container 2 and the outer container 3 to form a container body 5. A shoulder member 8 forming a handle 6 and a liquid inlet 7 is installed on an opening of the container body 5. A plug body 9 is provided which can be freely screwed to be attached and removed from the opening of the shoulder member 8.

The plug body 9 (FIGS. 4 thru 9) is made of synthetic resin and comprises a plug main body 10, a liquid passage 11, a valve body 13, a spring 14, a lever 16 and a cap 17. The plug main body 10 is cylindrical and screwed into the opening of the shoulder member 8. The liquid passage 11 is provided inside the plug main body 10. The valve body 13 is for opening and closing the liquid inlet 12 on the bottom end of the liquid passage 11. The spring 14 always pulls up the valve body 13 for closing the liquid inlet 12 with the valve body 13. The lever 16 pushes down to move downward a valve guide 15 of the valve body 13. The cap 17 covers the upper part of the plug main body 10.

The liquid passage 11 comprises an upper wall 11a, an inner wall 11b, two sidewalls 11c and 11c, and a ceiling wall 17a. The upper wall 1a is formed integrally with the plug main body 10 and provided on the upper part of the liquid inlet 12. The inner wall 11b is standing on one side of the upper wall 11a and is facing to the inner wall 10a of the plug main body 10. The two sidewalls 11c and 11c are enclosed between the inner wall 11b and the plug main body 10. The ceiling wall 17a is formed integrally with the cap 17 and covers the two sidewalls 11c, and the inner wall 11b. The liquid outlet 18 is open between the ceiling wall 17a and the upper end of the inner wall 10a of the plug main body 10, and is connected to the liquid inlet 12. When the plug body 9 is screwed into the shoulder member 8, the liquid outlet 18 is connected to the liquid inlet 7.

An upper wall 11a forms the insertion hole 19 for the valve guide 15 formed in the center of the upper wall 1a. A guide cylinder 20 of the valve guide 15 is provided surrounding the upper part of the insertion hole 19. An air hole 21 is formed opposite the liquid passage 11.

The spring 14 is embedded on the guide cylinder 20 and is installed between the upper portion of the upper wall 11a and a receiving seat 22 on the upper portion of the valve guide 15 protruded from the guide cylinder 20. The valve body 13 is always pulled up by the spring 14.

Figure 10:
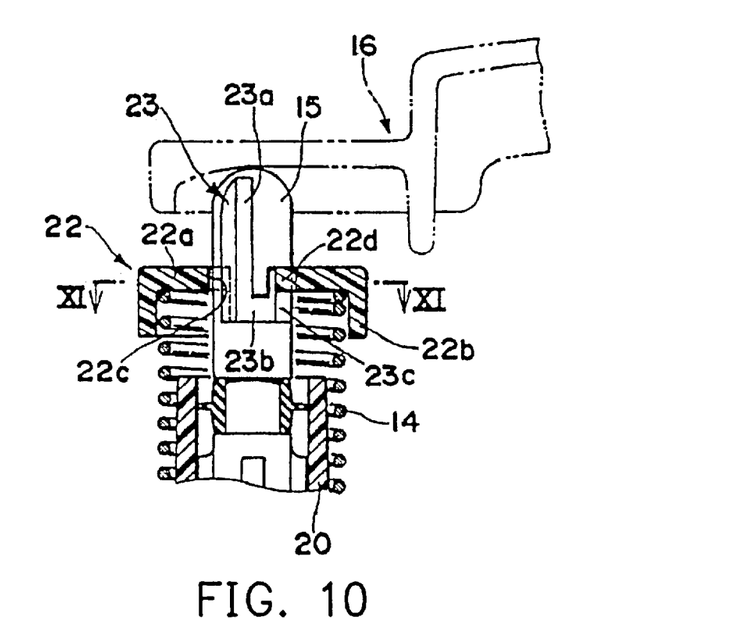
Figure 11:
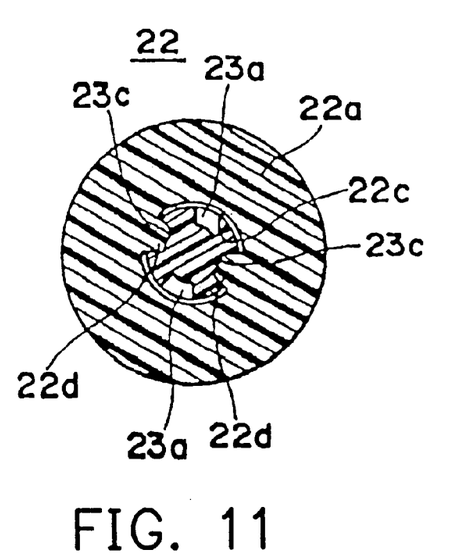
FIG. 11 is a XI—XI cross-section of FIG. 10.

The receiving seat 22 is freely attachable and detachable from the valve guide 15. Referring to FIG. 10, a flange 22b is formed to cover the spring 14 around a circular plate 22a. Fixing claws 22d and 22d face each other and are provided on the valve guide insertion hole 22c in the center of the circular plate 22a. A key groove 23 is formed to fix the receiving seat 22 on the upper portion of the valve guide 15. A key groove 23 comprises vertical grooves 23a and 23a, horizontal grooves 23b and 23b, and fixing grooves 23c and 23c. The vertical grooves 23a and 23a are provided along the axial direction of the valve guide 15. The horizontal grooves 23b and 23b are provided along the horizontal direction from the vertical grooves 23a and 23a. The fixing grooves 23c and 23c are bent at the horizontal grooves 23b and 23b and then twisted upward along the vertical axis. The fixing claws 22d and 22d are inserted into the vertical grooves 23a and 23a, and rotated horizontally to the position of the horizontal grooves 23b and 23b, and then fixing claws 22d and 22d are fixed by the fixing grooves 23c and 23c so that the receiving seat 22 is installed to the valve guide 15. When removing the receiving seat 22, the receiving seat 22 is pushed down, and rotated horizontally to the horizontal grooves 23b and 23b, and then pulled out from the fixing claws 22d and 22d through the vertical grooves 23a and 23a.

The lever 16 is capable of swinging freely on the two sidewalls 11c and 11c of the liquid passage 11. The pivots 24 are provided respectively protruded from the two sidewalls 11c, 11c for supporting the lever 16. The lever 16 includes a pair of the fixing arms 16a and 16a installed on the edge of the lever 16, and the pivots 24 are respectively inserted into the insertion hole 16b formed on each fixing arm 16a and 16a respectively, in order to be able to swing freely. The lever 16 protrudes over the top of the handle 6 from the notched part 17b formed on the cap 17 of the back top of the plug main body 10. The acting part 16d near the fixing arms 16a and 16a is abutted on the upper end of the valve guide 15. When the operating part 16c moves down, the acting part 16d pushes the valve guide 15 downwards, and the valve body 13 moves down to open the liquid inlet 12.

Figure 3:
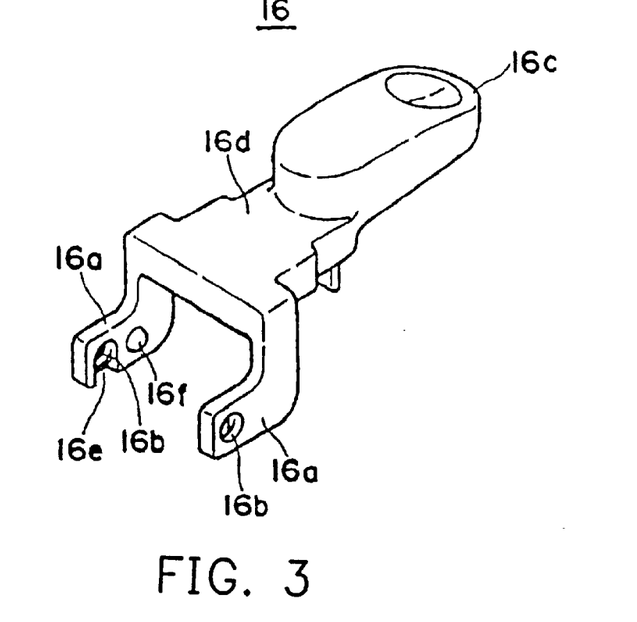
FIG. 3 is a perspective view of a lever wherein a boss member is a hemispheric shape.
Figure 4:
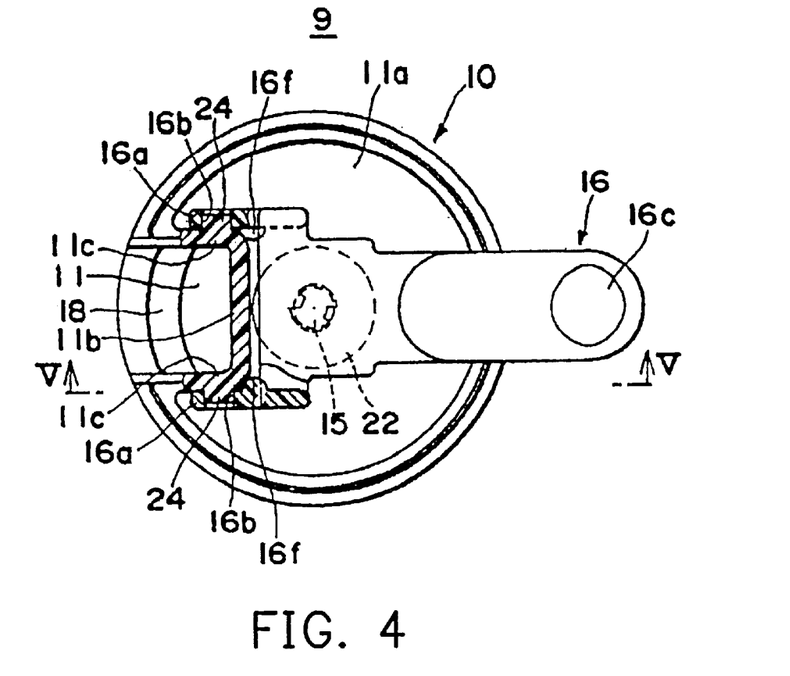
FIG. 4 is a planar cross-section view of the plug from above.
Figure 5:
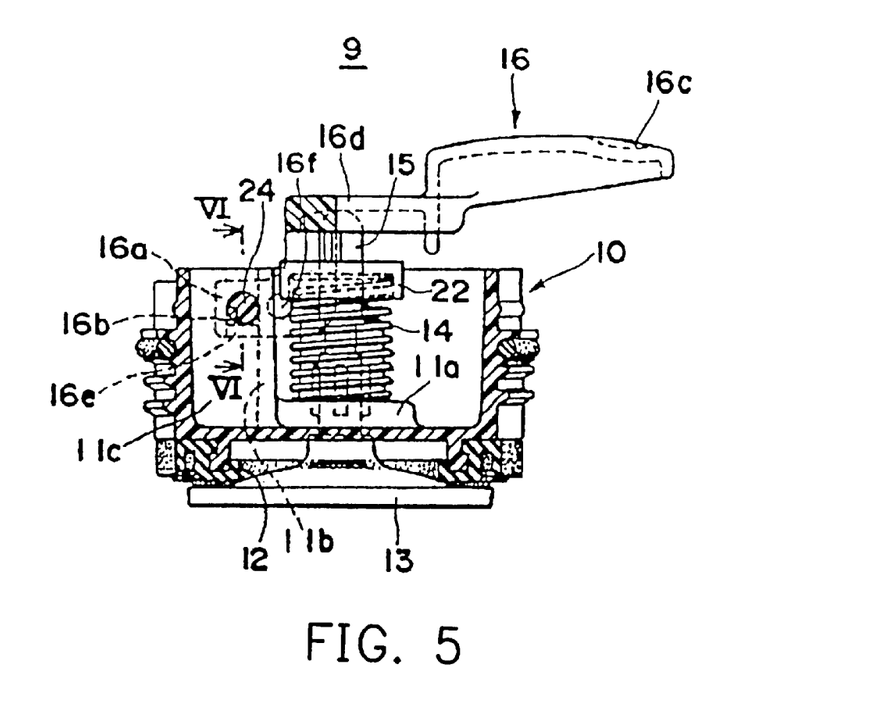
FIG. 5 is a V—V cross-section of FIG. 4.
Figure 6:
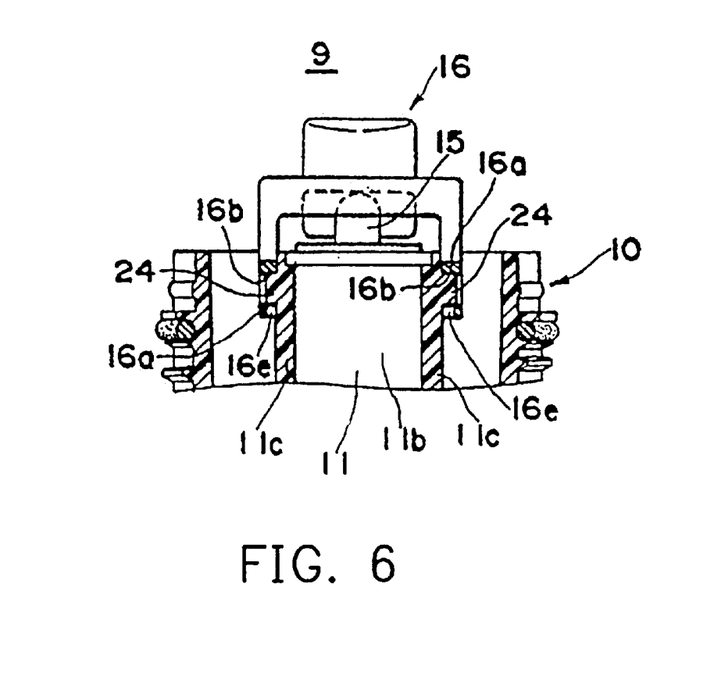
FIG. 6 is a VI—VI cross-section of FIG. 5.
Figure 7:
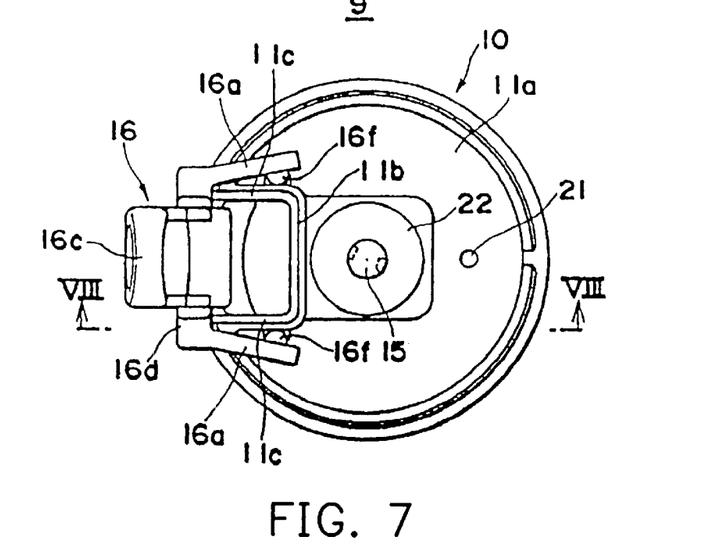
FIG. 7 is a planar view of a plug body when the lever is rotated in the direction opposite to operation.
Figure 8:
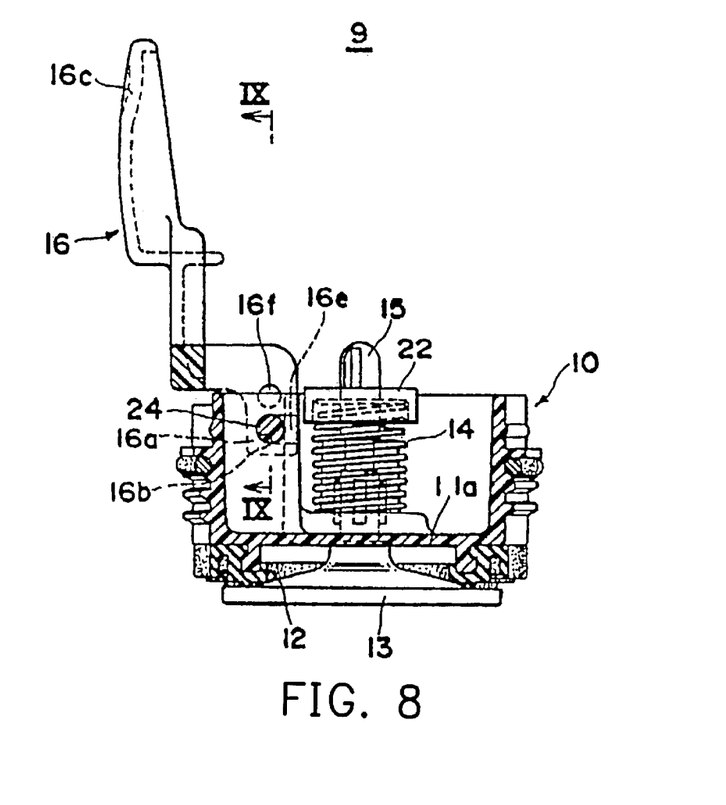
FIG. 8 is a VIII—VIII cross-section of FIG. 7.
Figure 9:
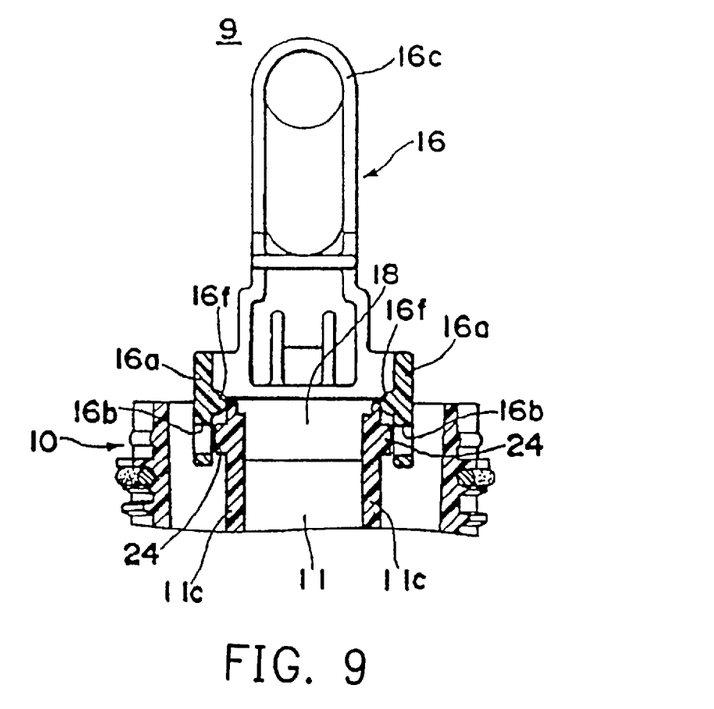
FIG. 9 is an IX—IX cross-section of FIG. 8.
Figure 12:
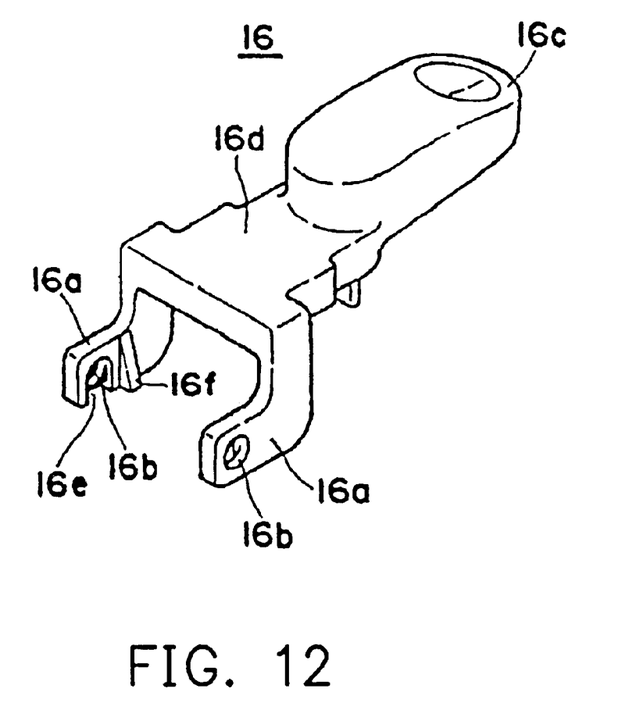
FIG. 12 is a perspective view of a lever wherein a boss member is a tapered rib.
Figure 13:
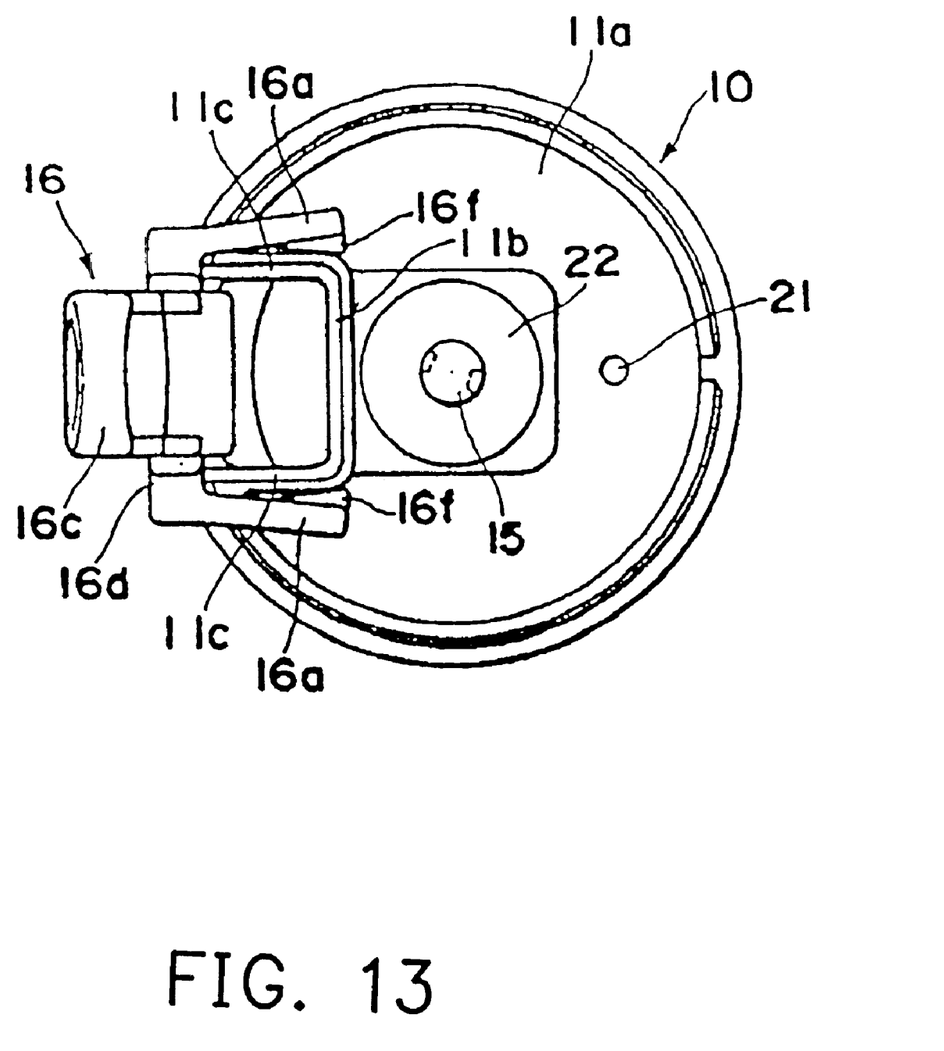
FIG. 13 is a planar view of a plug body when a lever is rotated in the opposite direction to operation and has a boss member with a tapered rib shape.

The guide grooves 16e are respectively formed on the fixing arms 16a, 16a for guiding the pivots 24 in the insertion holes to the lower positions of insertion holes 16b. the hemispheric shape of boss members 16f are respectively formed adjacent to the insertion holes 16b near the acting part 16c. When the boss member 16f is rotated in the direction opposite to operation, that is rotating upwards, boss members 16f make the lever 16 abut on sidewalls 11c and 11c in order to widen the gap between the fixing arms 16a and 16a, and then remove the insertion holes 16b from the pivots 24. In addition, the boss member 16f may also be a tapered rib as shown in FIGS. 12 and 13.

Referring to the structure mentioned above, to take apart the plug body 9, remove the cap 17 from the plug main body 10, move the lever 16 upward in the direction opposite to operation, and abut boss members 16f and 16f on the side walls 11c and 11c of the liquid passage 11 so that the gap between each fixing arm 16a and 16a of the lever will be widened, and the insertion holes 16 can be removed from the pivots 24. Subsequently, push down the receiving seat 22 and rotate it horizontally to the position of the horizontal grooves 23b and 23b, and pull out the fixing claws 22d and 22d from the vertical grooves 23a and 23a. Then remove the receiving seat 22 from the valve guide 15. Thereafter, the valve body 13 can be extracted from the upper wall 11a of the liquid passage 11. When the spring 14 is also removed from the guide cylinder 20, the plug body 9 can be taken apart and cleaned up properly in every nook and corner inside the plug body 9. When assembling the plug body 9, reverse the order above. Since the guide grooves 16e are provided under insertion holes 16b of the fixing arms 16a and 16a respectively, it is easy to assemble the fixing arms 16a and 16a to the pivots 24 and 24.

Therefore, it is easy to take apart and assemble each part of the valve body 13 and the lever 16 provided on the plug body 9. Even though the liquid inside the vacuum bottle 1 enters into the upper part of the upper walls 11a of the liquid inlet 12, it is possible to wash the inside in every nook and corner, therefore it can minimize the cause of unpleasant odors. Since both the receiving seat 22 and the liquid passage 11 of the lever 16 can be firmly assembled to the valve guide 15 and the side walls 11c and 11c respectively, each part will not come apart when operating. Furthermore, when removing the cap 17 from the plug main body 10, the upper part of the liquid passage 11 can be opened. Since the liquid passage 11 is vertical to the liquid inlet 12, it is also easy to wash.

In summary, according to the plug for a drinking container of the invention, a liquid passage is formed through the inner plug main body. A liquid inlet located in the lower part of the liquid passage is sealed with the valve guide. A lever pushes the valve guide downward to open up the liquid inlet. A pair of fixing arms is provided on the edge of the lever. Each insertion hole of a pivot installed in a protruding manner on two sidewalls of the liquid passage is formed on each fixing arm. When moving the lever upward in the direction opposite to operation, pivotally around each fixing arm, a boss member is abutted on the sidewall to widen the gap between each fixing arm and remove the insertion hole from the pivot. By moving the lever in the direction opposite to operation, the lever can be removed from the plug main body. Subsequently, a valve body can be also removed from the plug main body. Therefore it is easy to take apart and assemble the components of the plug body so that the inner plug can be washed in every nook and corner. Even if the liquid inside the drinking container enters into the parts outside of the liquid passage, unpleasant odors can be minimized. In addition, since the guide groove is formed to guide the pivot located inside the fixing arms to the insertion hole, it is easy to assemble the lever.

What is claimed is:

1. A plug for a drinking container, comprising:

a liquid passage having a liquid inlet at the bottom of the liquid passage and a liquid outlet connecting to a front end of the liquid inlet;

a guide cylinder installed on an upper wall of the liquid inlet in a hanging condition;

a valve guide of a valve body is inserted into the guide cylinder for opening and closing the liquid inlet;

a spring provided between the upper wall of the liquid inlet and a receiving seat on the upper part of the valve guide, for sealing the liquid inlet with the valve body by constantly pulling up the valve guide;

a lever capable of swinging centered on a pivot for abutting on an upper end of the valve guide, wherein the front end of the lever protrudes from a notched portion of the rear part of the plug main body, and the liquid inlet is opened by moving the lever downwards to lower the valve body;

a pair of fixing arms installed on an edge of the lever, each of the fixing arms having an insertion hole for the pivot; and a pair of boss members, abutting sidewalls when moving the lever in the direction opposite to operation so that the gap between the fixing arms is widened, and separating the insertion holes from the pivot.

2. The plug body for a drinking container of the claim 1, wherein guide grooves are provided to guide the pivot to the insertion holes on the inner surface of the fixing arms.

3. The plug body for a drinking container of claim 1, wherein the liquid passage is capable of being taken apart.

4. The plug body for a drinking container of claim 2, wherein the liquid passage is capable of being taken apart.

5. The plug body for a drinking container of claim 1, wherein the boss member is a hemispheric shape.

6. The plug body for a drinking container of claim 1, wherein the boss member is a tapered rib.

* * * * *